United States Patent [19]
Keith et al.

[11] Patent Number: 5,809,723
[45] Date of Patent: Sep. 22, 1998

[54] MULTI-PRONG CONNECTORS USED IN MAKING HIGHLY INSULATED COMPOSITE WALL STRUCTURES

[75] Inventors: David O. Keith; David M. Hansen, both of American Fork, Utah

[73] Assignee: H.K. Composites, Inc., American Fork, Utah

[21] Appl. No.: 895,680

[22] Filed: Jul. 17, 1997

[51] Int. Cl.[6] .............................. E04B 2/84; F16B 15/00
[52] U.S. Cl. .......................... 52/405.1; 52/426; 52/513; 52/700; 52/714; 411/475; 411/488; 411/921
[58] Field of Search ............................... 52/404.2, 405.1, 52/513, 425, 426, 700, 714; 411/457, 475, 483, 488, 921

[56] References Cited

U.S. PATENT DOCUMENTS

| | | | |
|---|---|---|---|
| 576,455 | 2/1897 | Johnson | 411/457 X |
| 1,511,711 | 10/1924 | Atwell | 411/475 X |
| 2,058,020 | 10/1936 | Jaffe | 411/457 X |
| 2,412,744 | 12/1946 | Nelson . | |
| 2,575,079 | 11/1951 | Temple . | |
| 2,595,123 | 4/1952 | Callan . | |
| 2,645,929 | 7/1953 | Jones . | |
| 2,653,469 | 9/1953 | Callan . | |
| 2,718,138 | 9/1955 | Jones . | |
| 2,769,333 | 11/1956 | Reintjes . | |
| 2,775,018 | 12/1956 | McLaughlin . | |

(List continued on next page.)

FOREIGN PATENT DOCUMENTS

| | | |
|---|---|---|
| 2024157 | 12/1971 | Germany . |
| 2715277 | 10/1978 | Germany . |
| 3925780 | 2/1991 | Germany . |

OTHER PUBLICATIONS

R. Layne, *Concrete–Plastic Sandwich Forms Walls Fast*, Popular Science, p. 1 (Sep. 1985).
*Sandwich Wall Panels for Expanded Corporate Offices and Warehouse*, CI Journal, pp. 148–152 (Jul.–Aug. 1979).
W.E. Yates, *Lightweight Cladding Cuts Costs at Worthing*, Concrete, pp. 12–13 (Dec. 1979).
P. Juhnke, *Tilt–Up Panels. Possible Key to Low–Cost Concrete Houses*, Concrete Construction, vol. 15, No. 5, pp. 156–157 (May 1970).
Composite Technologies Corporation product brochure for "Thermomass Building System" (1990).
Composite Technologies Corporation product brochure for "Thermomass Building System" (date unknown).
Preco Precast Division product brochure for "Fosroc®" (date unknown).

*Primary Examiner*—Christopher Kent
*Attorney, Agent, or Firm*—Workman, Nydegger & Seeley; John M. Guynn

[57] ABSTRACT

Multi-pronged insulating connectors used in manufacturing insulative composite wall structures. At least a substantial portion of the connector is injection molded in a single step from an appropriate resinous material or moldable plastic. One or more prongs of the connector have a substantially pointed end for facilitating penetration of the connector through an insulating layer and an unhardened structural material, such as concrete. The opposite end, or gripping segment, includes a bridging structure for connecting the multiple prongs together and structure for facilitating gripping of the connector during placement in the insulating layer and first unhardened structural layer. The connectors include structures for helping to anchor the connectors within the structural layers upon hardening.

20 Claims, 3 Drawing Sheets

U.S. PATENT DOCUMENTS

| | | |
|---|---|---|
| 2,964,821 | 12/1960 | Meehan . |
| 3,000,144 | 9/1961 | Kitson . |
| 3,131,514 | 5/1964 | Siek . |
| 3,208,328 | 9/1965 | Myers . |
| 3,304,676 | 2/1967 | Sallie et al. . |
| 3,426,494 | 2/1969 | Hala . |
| 3,523,359 | 8/1970 | Rutter et al. . |
| 3,646,715 | 3/1972 | Pope . |
| 3,701,228 | 10/1972 | Taylor . |
| 3,750,355 | 8/1973 | Blum . |
| 3,869,219 | 3/1975 | Wilson et al. . |
| 3,879,908 | 4/1975 | Weismann . |
| 3,969,975 | 7/1976 | Krol ................................ 411/457 X |
| 4,018,023 | 4/1977 | Anderson . |
| 4,157,001 | 6/1979 | Pickles . |
| 4,329,821 | 5/1982 | Long et al. . |
| 4,348,847 | 9/1982 | Jukes . |
| 4,393,635 | 7/1983 | Long . |
| 4,545,163 | 10/1985 | Asselin . |
| 4,624,089 | 11/1986 | Dunker . |
| 4,702,053 | 10/1987 | Hibbard . |
| 4,829,733 | 5/1989 | Long . |
| 4,907,928 | 3/1990 | Beck et al. . |
| 4,932,819 | 6/1990 | Almeras . |
| 4,945,700 | 8/1990 | Powell . |
| 4,948,312 | 8/1990 | Jochum . |
| 4,973,211 | 11/1990 | Potacek . |
| 5,011,354 | 4/1991 | Brownlee . |
| 5,031,378 | 7/1991 | Murphy . |
| 5,094,057 | 3/1992 | Morris . |
| 5,265,998 | 11/1993 | Kluser . |

MULTI-PRONG CONNECTORS USED IN MAKING HIGHLY INSULATED COMPOSITE WALL STRUCTURES

BACKGROUND OF THE INVENTION

1. Field of the Invention

This invention relates to insulative connectors used to secure together multiple layers of insulating and structural material within a composite wall structure. In particular, the invention relates to the manufacture and use of multi-pronged connectors for securing together an insulating layer and preferably two structural layers on either side of the insulating layer.

2. The Relevant Technology

As new materials and compositions have been continuously developed, novel methods for synergistically combining apparently unrelated materials to form useful composites have also been deployed. In the area of building and construction, high strength structural walls have been fabricated and then coated or layered with highly insulative materials, which generally have relatively low structural strength, to provide a composite structure having both high strength and high insulation. Conventionally, the structural component, such as a wall, is built first, after which the insulating layer or sheet is attached to the structural component. Thereafter a protective cover is placed over the insulating material to protect and hide it. The purpose of the insulation barrier is to impede the transfer of thermal energy across the structural wall.

One of the least expensive and strongest building materials that has found extensive use in the construction industry is concrete. Unfortunately, concrete offers relatively poor insulation compared to highly insulating materials such as fiberglass or polymeric foam materials. While an 8 inch slab of concrete has an R value (which is the measure of resistance to flow of thermal energy through a material) of 0.64, a 1 inch panel of polystyrene foam has an R value of 5.0. Conversely, highly insulative materials typically offer little in terms of structural strength or integrity.

While concrete walls can be retrofitted with an insulating material, one strategy is to manufacture a composite wall structure having two structural layers separated by a core insulating layer. In general, concrete walls and composite wall structures can be manufactured by either casting them in place ("cast-in-place method") or by casting them horizontally and then tilting them up vertically ("tilt-up method"). In order for a composite wall structure to have sufficient strength and integrity, and to prevent the two structural walls from collapsing together or separating apart during construction and subsequent use, it is necessary to structurally bridge the two concrete walls together. This has conventionally been accomplished through the use of metal studs, bolts, or beams. Examples of composite wall structures using metal tie rods or studs may be found in the following U.S. Patents: U.S. Pat. No. 4,393,635 to Long, U.S. Pat. No. 4,329,821 to Long et al., U.S. Pat. No. 2,775,018 to McLaughlin, U.S. Pat. No. 2,645,929 to Jones, and U.S. Pat. No. 2,412,744 to Nelson.

However, because metal is highly thermally conductive, such studs, bolts, beams, or other means for structurally bridging the two walls together can create a thermal bridge through the insulating layer. Thus, though the structural walls might be separated by a very efficient insulating material having a high R value, the net R value of the overall composite structure can be far less when metal connectors are used, thus negating or at least greatly diminishing the effect of the insulation layer.

In order to reduce thermal bridging, some have employed connector rods having a metal portion that passes through the concrete layers and a thermally insulating portion that passes through the insulating layer, e.g., U.S. Pat. No. 4,545,163 to Asselin. Others have developed connector rods made entirely from high R-value materials, e.g., U.S. Pat. No. 4,829,733 to Long; U.S. Pat. No. 5,519,973 to Keith et al.; U.S. Pat. No. 5,606,832 to Keith et al.; and U.S. application Serial No. 08/731,469, filed Oct. 15, 1996 in the names of David O. Keith and David M. Hansen, and entitled "Insulating Connector Rods Used in Making Highly Insulated Composite Wall Structures", which is a file-wrapper-continuation of application Ser. No. 08/558,734, filed Nov. 16, 1995. For purposes of disclosure, the foregoing references are incorporated herein by specific reference.

One of the structural drawbacks of concrete is that it expands and contracts when exposed to changing temperatures. In the case of composite wall structures, wherein the interior wall will be at room temperature and the outer wall will be at a different temperature, uneven relative movement of the two layers can occur due to different levels of expansion or contraction caused by temperature differentials. In extremely cold seasons, the outer wall will shrink relative to the inner wall, while in extremely hot seasons, the outer wall will expand relative to the inner wall. If one end of the walls are restrained, all movement caused by expansion or contraction occurs toward the opposite end. As a result, depending on the length of the wall, significant relative movement between the outer and inner walls can occur.

Because connectors used to structurally secure the two walls together are generally oriented orthogonally to the generally parallel structural walls, the relative movement of the inner and outer walls can exert significant shear stress and strain on the connectors. Depending on the amount of shear stress and strain, as well as the stiffness of the connectors embedded in the structural walls, the connectors may be forced to flex considerably such that they may either bend or even fail in some cases. While failure of the connectors will obviously compromise the structural integrity of the composite wall structure, excessive bending can have a long term weakening effect. Some plastics that are generally resistant to the alkalinity of concrete can become vulnerable to alkaline attack if deflected to a great enough degree.

In view of the foregoing, connectors must be tailored to be sufficiently flexible to withstand the inevitable shear stresses due to uneven relative expansion and contraction of the inner and outer walls. However, they must maintain sufficient tensile and shear strength so that they will be able to remain embedded in place and maintain the structural integrity of the composite wall structure. In general, flexibility, stiffness, tensile strength and shear strength are all a function of cross-section thickness so that thicker connectors are both stiffer and stronger than narrower ones. Different materials can also be used to alter the flexibility and strength of the connectors.

In many cases, making a connector sufficiently flexible to withstand shear stresses caused by uneven relative movement of the structural layers can compromise the strength parameters such that doubling up or otherwise increasing the number of connectors generally becomes necessary. This is especially true where a thinner layer of insulation is used. The smaller the distance between the two walls, the shorter the length of the connector that is free to bend, which proportionally increases the degree of localized stress and strain on the connectors.

It is possible to maintain high tensile strength while increasing flexibility by using connectors having a reduced width along the line of stress, e.g., a connector having a flat or elliptical portion residing within the insulating layer. An example of an elliptical connector is set forth in U.S. Pat. No. 5,519,973 to Keith et al. However, in order to derive the benefits of both adequate strength and high directional flexibility, such connectors must be properly oriented so that they are most flexible in the direction they will be required to bend. This can complicate the building process and require added training and supervision of the installers. Improper orientation of an elliptical connector can have devastating consequences since an improperly oriented elliptical connector can be even stiffer than its cylindrical counterpart if rotated 90° relative to its proper orientation.

In view of the foregoing, what are needed are improved connectors that are sufficiently flexible to resist failure and damage caused by uneven relative expansion of the structural layers but which have sufficient tensile and shear strength to maintain the structural integrity of the composite wall structure.

It would be a further improvement in the art to provide connectors which have appropriate strength and flexibility characteristics but which do not substantially increase the time and cost of placing the connectors caused by the need to increase the number of connectors.

It would be a tremendous improvement in the art if such connectors actually reduced the time and effort needed to place the connectors compared to conventional connectors.

Additionally, it would be an improvement in the art if such connectors could be molded in a single step, or using a minimal number of steps, such that manufacturing costs could be reduced per unit connector.

Further, it would be an improvement if such connectors provided means for penetrating an insulation layer and an unhardened structural layer during placement.

In addition, it would be an improvement if such connectors provided means for easily grasping and placing the connectors to aid the installer.

It would yet be an improvement to provide connectors that included means for ensuring proper spacing between clusters of connector units.

Finally, it would be an advancement if the connectors included stopping or abutment means for controlling the depth of penetration through the insulating layer and unhardened structural layer during placement of the connectors.

Such improved connectors having structural features that improve the necessary flexibility and strength properties are set forth and claimed herein.

SUMMARY OF THE INVENTION

The present invention relates to multi-prong connectors used in the manufacture of composite wall structures. Such connectors may be used in the manufacture of highly insulating composite wall structures having an insulating layer sandwiched between two concrete structural layers. Such composite wall structures have high strength and high insulation, or resistance to thermal flow. The multi-prong connectors of the present invention effectively allow for the equivalent of placing multiple single-prong connectors in a single placement action. This greatly reduces the time it takes to place an adequate number of connectors while increasing the strength of the wall structure since the multiple prongs of each connector are placed together in close proximity to each other. Such connectors can be made to have more flexibility since the increased number of prongs overcomes whatever strength reduction may occur by increasing their flexibility. The multiple prongs can also be spaced at regular or planned intervals that ensure desired spacing therebetween compared to where the installer must install a cluster or group of individual connectors.

All of the foregoing features make the inventive multi-prong connectors superior in many respects compared to conventional single-prong connectors. Nevertheless, they can generally be manufactured in a single molding step, such as by injection molding, like their single-prong counterparts. The multi-prong connectors can have from two prongs up to whatever number of prongs is desirable and feasible given a particular building need. In the case of three or more prongs, the prongs can be aligned in a plane or arranged in a three-dimensional orientation. The only constraint is that the arrangement not be so complicated or obtuse that manufacture is prohibitively expensive and/or that placement becomes too difficult. The lengths of the prongs can vary in order to assist in placement, with the longer prongs acting as a placement guide prior to inserting the shorter prongs.

In a preferred embodiment, the multi-prong connectors are injection molded from a polyphthalimide resin or other high strength resin or moldable plastic material. Another preferred material is a polycarbonate "alloy" consisting of polycarbonate and polybutylene teraphthalate. In some cases, where increased tensile and flexural strength are desired, fibers such as glass fibers, graphite fibers, mineral fibers, boron fibers, ceramic fibers, polymeric fibers and the like may be impregnated within the resin to form connectors having increased strength and stiffness. The use of more flexible fibers, such as cellulosic, nylon, or other polymeric fibers would be expected to increase the toughness and decrease the brittleness of the connectors. Nevertheless, where fibers are unnecessary it will be preferable to not use them due to the generally increased cost of their use.

In a preferred embodiment, each prong of the inventive connectors includes an elongate shaft having at one end a substantially pointed or tapered tip, which facilitates penetration through the insulating layer and a first unhardened structural layer. The other end of the shaft will include means for adjoining the prong with at least one other prong. The prongs are generally connected at the ends of the shaft opposite the pointed tips so that the individual prongs are unobstructed during placement through the insulating layer and first structural layer. The end opposite the pointed tips will also typically include a gripping feature for ease of placement by the installer. The combination of having substantially pointed tips at one end of the connector coupled with a gripping feature at the opposite end greatly facilitates their placement through the insulating layer and first structural layer, which would be expected to reduce the time and cost of manufacturing composite wall structures. The means for connecting the multiple prongs might itself provide depth limiting means, or the connectors might include a separately molded stop or orienting means to regulate the depth of placement.

Each prong includes a middle portion, or "mesial segment", which is intended to reside within the insulating layer. The mesial segment is preferably designed to form a close fit with the insulating layer to reduce or prevent the incursion of concrete or other flowable structural material around the mesial segment and into the interior of the volume defined by the insulating layer. The mesial segment is also the portion of each prong that will bear the brunt of most shear stresses that might result from differential relative expansion of the two structural layers. Each prong also includes a "penetrating segment" that is intended to reside within the first structural layer, while the connector as a whole, including a portion of the individual prongs in some cases, will include a "gripping segment" that is intended to reside within the second structural layer.

The tapered ends of each prong facilitate insertion of the connectors through the insulation layer and first unhardened structural layer compared to, e.g., connectors having a rectangular cross-section on both ends, which design is commonly used in the industry. The use of rectangularly-ended connectors require that holes be predrilled through the insulation layer since they are not "self-tapping". In contrast, the tapered ends of the inventive connectors allow for easy penetration through an insulating layer having reduced hole sizes drilled therethrough, or even no holes at all, since the tapered ends can be sufficiently pointed in some cases so that the connector is self-tapping. In a simple design, the tapered end could simply comprise a cone-shaped tip. Alternatively, the end could have a pyramidal (3-, 4-, or multi-faceted) shape rather than a conical tip and still fall within the definition of "substantially pointed" or "tapered". The result would be substantially the same in each case. A wedge-shaped or "chisel" end, which closes up to a line rather than a single point, would be somewhat less preferable but far superior to the rectangular surface of prior art connectors.

At least one of the prongs of each connector will further include one or more recessed portions in the penetrating segment for anchoring the connector within the first hardened structural layer. During placement, unhardened concrete or other structural material will tend to flow into the recessed portion. Upon hardening, the concrete or other structural material within the one or more recessed portions will firmly and reliably anchor that prong of the connector firmly within the first structural layer of the composite wall structure. Some movement of the connectors can help consolidate the concrete or other structural material within the one or more recessed portions, although improper movement can also open up a space around the prongs, which can reduce secure anchoring of the prong. Even prongs without recesses will be anchored within the structural material upon hardening to some degree.

The gripping segment is defined as the portion of the connector which is intended to be gripped or held by the technician during placement of the connectors through the insulating layer and the first structural layer. Because the gripping segment does not substantially penetrate the insulating layer, it will eventually be covered over by or enveloped within the second structural layer. It therefore includes means for anchoring the gripping segment within the second structural layer. The bridging means for interconnecting the plurality of prongs together will itself tend to provide an anchoring structure in some cases. Nevertheless, additional protrusions, loops, gaps, or other structures can be designed into the gripping segment for more reliably anchoring the gripping segment within the second structural layer. The gripping segment will also include some stopping means for limiting the depth of penetrating, whether by the bridging structure itself, or by some additional structure attached to, e.g., one or more of the prongs.

In light of the foregoing, the gripping segment provides at least three functions: (1) it facilitates gripping or handling by the technician, (2) it includes means for limiting the penetration of the connector or connectors through the insulating layer, and (3) it provides means for anchoring the connector within the hardened structural layer.

Accordingly, it is an object and feature of the present invention to provide improved connectors that are sufficiently flexible to resist failure and damage caused by uneven relative expansion of the structural layers but which have sufficient tensile and shear strength to maintain the structural integrity of the composite wall structure.

It is a further object of the present invention to provide connectors which have appropriate strength and flexibility characteristics, but which do not substantially increase the time and cost of placing the connectors caused by the need to increase the number of connectors.

In addition, it is an object of the present invention to provide connectors that actually reduce the time and effort needed to place the connectors compared to conventional connectors.

It is a further object and feature of the invention to provide connectors that can be molded in a single step, or using a minimal number of steps, such that manufacturing costs can be reduced per unit connector.

In addition, it is an object of the present invention to provide connectors that include means for penetrating an insulation layer and an unhardened structural layer during placement.

It is a further object of the present invention to provide connectors that include means for easily grasping and placing the connectors to aid the installer.

Further, it is an object of the present invention to provide connectors that include means for ensuring proper spacing between clusters of connector units.

Finally, it is an object and feature of the present invention to provide connectors that include stopping means for controlling the depth of penetration through the insulating layer and unhardened structural layer during placement of the connectors.

These and other objects and features of the present invention will become more fully apparent from the following description and appended claims, or may be learned from the practice of the invention as set forth hereinafter.

DETAILED DESCRIPTION OF THE PREFERRED EMBODIMENTS

Figure 1:
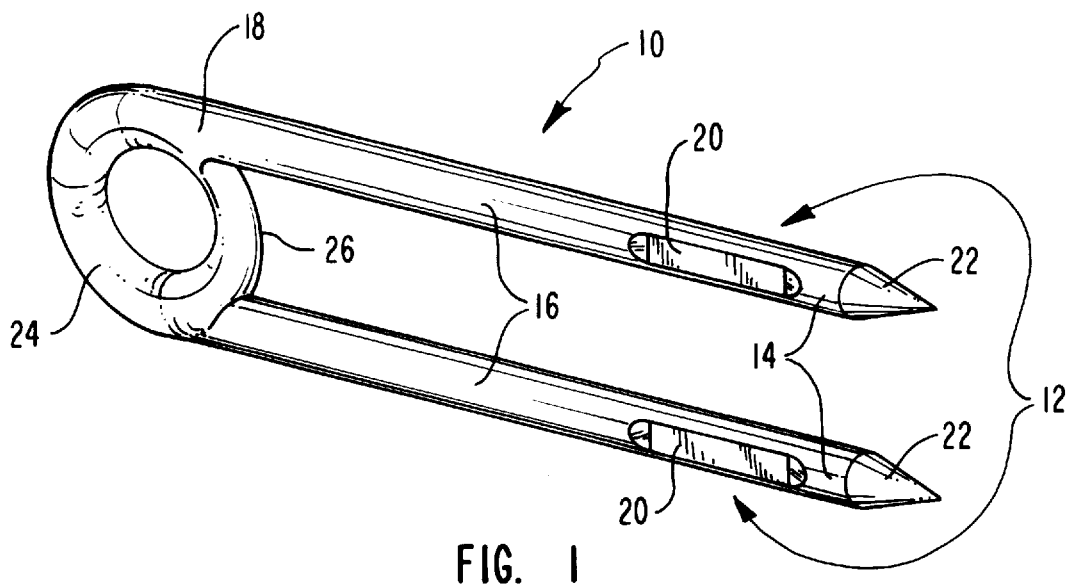
FIG. 1 a perspective view of a preferred insulating connector have two prongs.

The present invention relates to specially designed, insulative connectors having multiple prongs used in the manufacture of composite wall structures. Such connectors can be manufactured in a single step to yield connectors having a wide variety of structural features and accessories therein. Such connectors are designed to secure together two structural layers that are separated at a predetermined distance by an insulating layer therebetween comprising a highly insulating, or high R value, material. Because the connectors also are made from a high R value material, they prevent or greatly reduce the flow of heat between the two concrete walls or other structural layers compared to, e.g., solid metal connectors. The design of the connectors makes them especially useful in the manufacture of composite wall structures using the tilt-up method. However, they are not limited to any particular method of use for manufacturing composite wall structures.

The connectors of the present invention are preferably injection molded from any appropriate resin or other high strength plastic material, although they may also be molded by resin transfer molding, reaction injection molding, or any other single-step or relatively simple molding process known in the art. An important criterion is that the manufacturing costs of the molding process be commensurate with the overall cost parameters of the connector to be used.

The connectors of the present invention can be molded from a variety of thermoplastic and thermoset materials. Preferred thermoplastic resins include polyamides (nylon), polyarylsulfones, polycarbonates (PC), polyphthalamides (PPA), polysulfones (PSF), polyphenylsulfones, polyethersulfones, and aliphatic polyketones (PK). Less preferred thermoplastics that are nevertheless adequate for most applications include acrylics, acrylonitrile-butadiene-styrene copolymers (ABS), polyfluorocarbons, polybutadienes, polybutylene teraphthalates (PBT), polyesters, polyethylene teraphthalates (PET), polyphenylene ethers, polyphenylene oxides (PPO), polyphenylene sulfides (PPS), polyphthalate carbonates, polypropylene, polystyrene, polyurethanes, polyvinyl chloride, and polyxylene. Some of the thermoplastic resins can advantageously be used together as "allows". A preferred thermoplastic alloy is PPO/Nylon. Other thermoplastic alloys include ABS/PC, PBT/PET, PC/PBT, PC/PET, and PS/PC.

Preferred thermoset resins include polyester and vinyl ester. Other thermoset resins include diallyl phthalate (DAP), epoxy resins, furan resins, and phenolic resins. The foregoing lists are illustrative but not limiting. The only criteria is that the type of material that is used have sufficient strength and flexibility to avoid failure during the intended use of the connectors and have a sufficiently high R value such that the connector does not create an unduly conductive thermal bridge or conduit through the insulating barrier. Even low density ceramics having low specific heat and high insulation could be used in some cases. An important criterion is to select a resinous material or other plastic having the desired properties of strength, flexibility and insulation depending on the performance criteria of the composite wall structure to be fabricated.

Although not necessary in many instances, it may be desirable to incorporate within the resinous material or other plastic material fibers such as glass fibers, graphite fibers, boron fibers, cellulosic fibers, nylon fibers, other polymeric fibers, ceramic fibers, and the like in order to increase the tensile strength, bending strength, and toughness of the connector. Fibers can also increase the shear strength of the connector if adequately randomly dispersed throughout the resinous or other plastic material. Nevertheless, where fibers are not necessary in order to impart greater strength or stiffness to the connector, it will usually be preferable to exclude them due to the generally increased cost of their use.

Because the use of resins or other moldable plastics (whether or not impregnated with fibers) allows for an almost endless variety of design configurations that can be molded into a connector in a single step, such connectors can include a wide variety of structural features or accessories without increasing the cost of manufacture. Many connectors presently used in making composite wall structures are formed by pultruding continuous fibers through a resinous material, which thereafter must be cut, machined, and then retrofitted with even the most minor additional structural features due to the limitations inherent in the pultrusion method of molding (e.g., U.S. Pat. No. 4,829,733 to Long). Pultrusion, like extrusion, is inherently only capable of yielding rods of uniform cross-section corresponding to the die head design. Nevertheless, the simplicity of design of the connectors of the present invention might make pultrusion economically feasible for certain designs and applications, particularly connectors having only two prongs.

Moreover, although it is preferable to form the entire connector from a single material due to the ease of injection molding the inventive connectors in a single step, the connectors can be assembled to form the multi-prong connectors. For example, a bridging structure can be made to accommodate any of a number of different styles of prongs and/or varying numbers of prongs. To the extent that such a structure will reside within the structural layer or otherwise not penetrate all the way through the insulating layer so that it directly bridges the two structural layers together it can be made using a metal or other thermally conductive material. The same is true for the penetrating segments, which reside within a structural layer as well. What is important is that the mesial segment not thermally bridge the two structural layers together. To the extent that thermal bridging can be avoided, or at least reduced to acceptable levels, metal substructures can be incorporated within the connectors of the present invention for, e.g., increasing the strength and durability of the inventive connectors.

Reference is now made to FIG. 1, which depicts a first preferred embodiment of a connector 10 according to the present invention. The connector 10 includes two generally parallel and elongate prongs 12 that are preferably either cylindrical or ellipsoidal. Nevertheless, the prongs 12 can have any generally regular cross-sectional shape, such as a square, rectangle, triangle, pentagon, hexagon, octagon, cruciform, and the like. Each of dual prongs 12 includes a penetrating segment 14 and a mesial segment 16, while the connector as a whole includes a gripping segment 18. The boundaries between the penetrating segment 14, mesial segment 16, and gripping segment 18 are relative and depend on the thickness of the insulating layer and the depth of placement. The actual boundaries between the penetrating segment 14, the mesial segment 16, and the gripping segment 18 will correspond to planes defined by the interfaces between the first structural layer, insulating layer, and second structural layer, respectively.

The penetrating segment 14 of each prong 12 includes a substantially pointed or tapered penetrating tip 22 disposed at a first end of each prong 12. Although the penetrating tip 22 is depicted as having a generally conical shape, as shown in FIG. 1, it can be of any shape so long as it generally ends in a tip having a substantially reduced cross-sectional diameter relative to the diameter of each prong 12. For example, the penetrating tip 22 can have a chisel-shaped or even a rounded tip. The penetrating tip 22 facilitates entry of the connector 10 through an insulating layer and a first layer of fresh, unhardened structural material, as set forth more fully below.

In addition, the penetrating segment 14 of at least one of the prongs 12 includes at least one recessed portion 20 disposed somewhere between the penetrating tip 22 and the intersection or boundary between the penetrating segment 14. As set forth more fully below, the penetrating segment 14 is intended to substantially penetrate and be anchored within a first structural layer. The one or more recessed portions 20 are designed for receiving flowable or plastic concrete or other hardenable structural material therein for anchoring the connector 10 within the first structural layer upon curing or hardening of the structural material.

Further up each prong 12 is a corresponding mesial segment 16, which is generally of uniform shape, and may be cylindrical or may have a cross section of, e.g., a square, ellipse, rectangle, triangle, pentagon, hexagon, octagon, cruciform or any other generally uniform cross section. The mesial segment 16 generally includes no auxiliary structural features and is intended to occupy, in a close-fitting manner, a hole within an insulating layer, which may be formed by predrilling the insulating layer. Alternatively, the hole in the insulating layer can be formed by means of the penetrating tip 22, which can be "self-tapping" in many instances. By definition, the length of the mesial segment 16 is generally defined by the thickness of the insulating layer. If the connector 10 is placed orthogonally relative to an insulating layer of uniform thickness, the length of the mesial segment 16 will then be substantially equal to the thickness of the insulating layer. Nevertheless, the length of the mesial segment 16 can vary, e.g., where the connector 10 is placed at an angle different than orthogonal, or where the insulating layer has varying cross-sectional thicknesses.

At an end opposite the substantially pointed tip 22, the prongs 12 merge or are otherwise joined or connected together in the region identified as the gripping segment 18. The boundary between the gripping segment 18 and the mesial segment 16 is the interface between the insulating layer and second structural layer. In general, the gripping segment 18 can be identified as the portion of the connector 10 that extends beyond the portion of the connector that makes abutting contact with the insulating layer and which extends outward from the insulating layer upon placing the connector therein. As depicted in FIG. 26, the lower edge 26 of a bridging loop 24 will first make abutting contact with an insulating layer and will therefore comprise abutment means for limiting penetration of the connector 10 during placement. The bridging loop 24 serves the additional functions of bridging or connecting the dual prongs 12 together in a desired spacing arrangement, and also providing gripping means for the installer. An installer can insert and hook a finger through and around the bridging loop 24 or in whatever manner is most comfortable.

The bridging loop 24 also functions to provide means for anchoring the gripping segment 18 within the second structural layer upon hardening. The structural material while in a plastic and flowable state, will flow into the hole within the bridging loop. Thereafter, as the structural material hardens the bridging loop will prevent the gripping segment 18 from moving in any direction within the hardened second structural layer since it will be effectively anchored and locked therein.

Because of the ease in which the connectors of the present invention may be injection molded, the dual prongs 12, including the penetrating tip 22, recessed portions 20, and bridging loop 24 can be quickly and easily formed within the connector 10 in a single molding step. Nevertheless, one may wish to incorporate one or more structural features or accessories into the connectors using one or more separate molding or forming steps. In addition, a freshly molded connector may, if desired, be structurally altered such as by curving or bending the connector while still in an unhardened condition. Auxiliary structural features can be made of any appropriate material so long as they do not form an unacceptable thermal bridging effect that would reduce the overall thermal resistance of the composite wall structures to an unacceptably low level.

Figure 2:
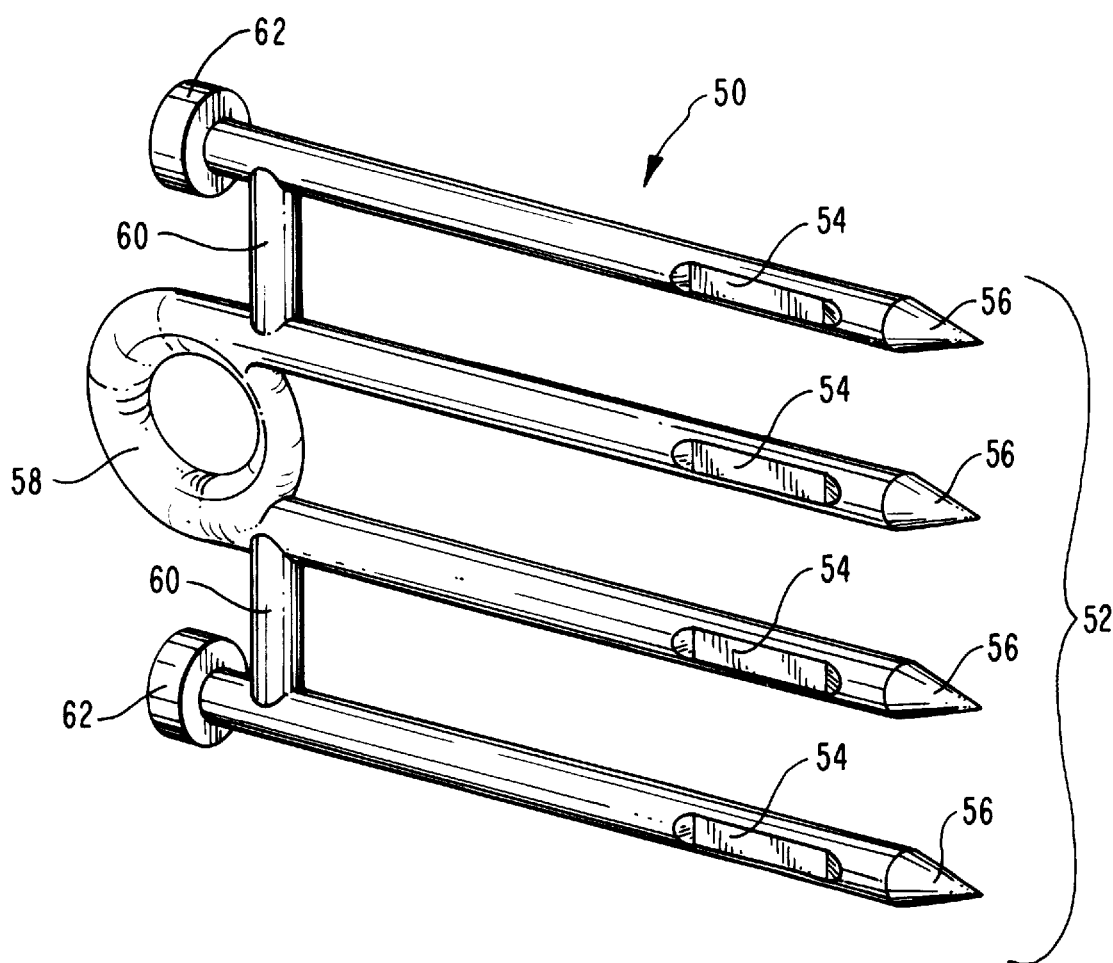
FIG. 2 is a perspective view of an alternative insulating connector having four prongs.

The connectors of FIGS. 2–4 and 6 function in a similar manner compared to the connector of FIG. 1, except that they have varying functional and design features that alter the look, feel and function of the various connectors. For example, connector 50 depicted in FIG. 2 includes many of the features of connector 10, including a pair of inner prongs 52 that are joined together by a bridging loop 58 similar to the bridging loop 24 of connector 10. However, the connector 50 includes two additional prongs 52, each disposed on either side of the inner prongs to form a four-pronged connector. Each of the two additional prongs 52 are joined to the inner two prongs in the vicinity of the bridging loop 58 by means of auxiliary bridging structures 60. As depicted in FIG. 2, the prongs 52 of connector 50 are aligned in a plane, are generally equidistant from each other, and have approximately the same length and structural features at one end. Each prong 52 includes a substantially pointed tip 56 and at least one recess 54. However, while the two inner prongs 52 terminate at the other end of the bridging loop 58, the outer two prongs 52 each terminate with an anchoring head 62.

It should be understood that prongs 52 can have varying lengths, e.g., the outer prongs can be longer than the inner prongs, or vice versa (not shown). The prongs 52 could be spaced apart at different lengths and they could be aligned in a three-dimensional configuration rather than in a plane (not shown). Not all the prongs 52 need to have a recess 54, although better anchoring is generally achieved if they do. Although the auxiliary bridging structures 60 appear in FIG. 2 to provide the abutment means for limiting penetration of the connector 50 through the insulating layer and first structural layer during placement, they could alternatively be oriented so that bridging loop 58 makes first abutting contact (not shown), as in the connector 10 of FIG. 1.

When deployed, the recesses 54 will receive flowable structural material therein which, when hardened, will cause the penetrating segments of the prongs 52 to be firmly anchored within the first hardened structural layer. Likewise, flowable structural material will flow into the hole within the bridging loop 58 as well as underneath and around the anchoring heads 62 which will, upon hardening, cause the gripping segment of connector 50 to be firmly anchored within the second structural layer. The bridging loop 58 facilitates gripping during placement, while anchoring heads 62 can be pushed or manipulated manually or with a mallet or hammer as desired to ensure proper alignment of the connector 50. Structures which facilitate insertion using pneumatic equipment or other automated systems can be formed into the connectors as well.

Figure 3:
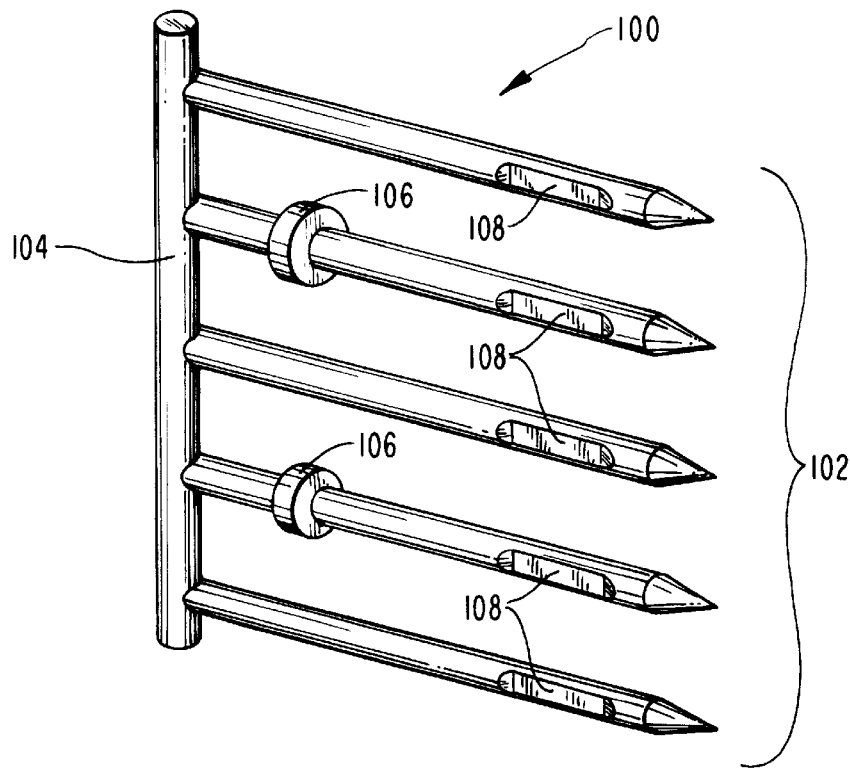
FIG. 3 is a perspective view of another alternative insulating connector having five prongs.

The connector 100 of FIG. 3 is similar to the connectors of FIGS. 1 and 2, except that it includes a bridging bar 104 that spans the entire length of the gripping end. The bridging bar 104 interconnects each of five prongs 102 of the connector 100 and extends slightly on either end for increased anchoring capacity. Each prong 102 depicted in FIG. 3 is of the same length, is equally spaced along a plane, is pointed, and includes a recess 108. As stated above, any of these can be altered as desired to impart other desired properties. The connector 100 includes a pair of abutment stops 106, which provide depth-limiting means that orient the connector 100 during placement through an insulating layer and first structural layer. The bridging bar 104 can serve as a gripping bar in which an installer's fingers can be placed between the individual prongs 102 and closed to grip the bridging bar 104 like a handle. The bridging bar 104 also serves to anchor the connector 100 within the second structural layer after flowable structural material is caused to flow underneath and around the bridging bar 104 and then hardened.

Figure 4:
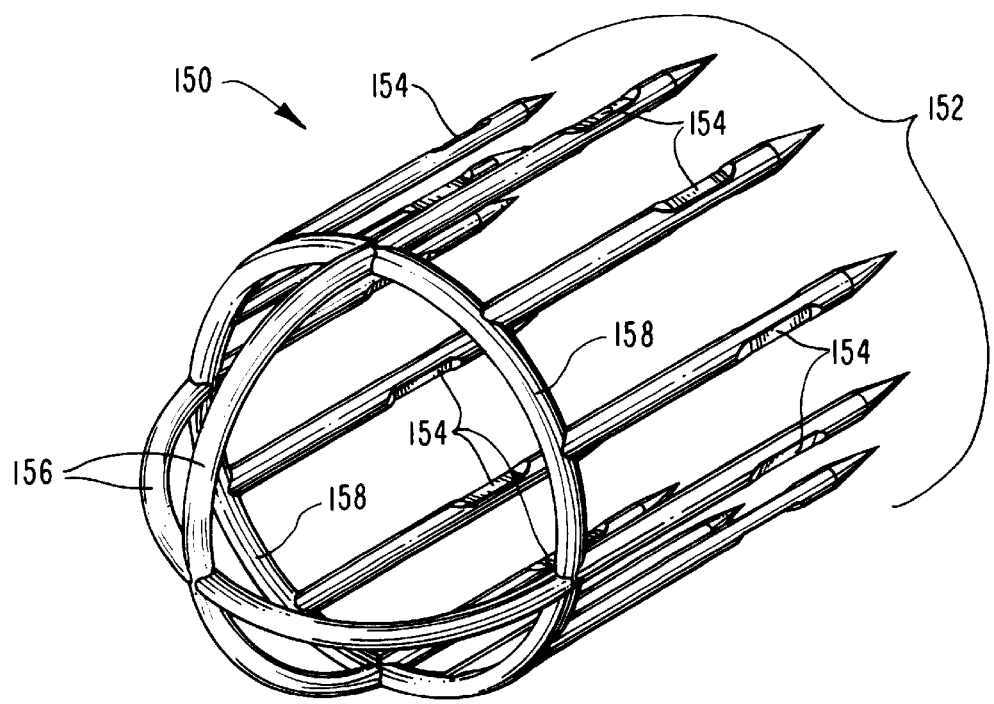
FIG. 4 is a perspective view of yet another alternative embodiment of a connector having twelve prongs oriented in a circular arrangement.

Reference to FIG. 4 reveals a three-dimensional connector 150 having twelve prongs 152 oriented in a circular fashion and connected together by means of a circular bridging bar 158. A pair of arched gripping bars 156 are disposed in a perpendicular fashion relative to each other and are adjoined to the bridging bar 158. Each of the prongs 152 are depicted as having a similar length, a pair of recesses 154, and are oriented equidistant from each other in a circle. As before, this design can be altered such that the prongs 152 can be oriented in any feasible geometric manner so long as manufacture is not prohibitively difficult and the desired mechanical properties are provided. As depicted in FIG. 4, the circular bridging bar 158 provides abutment means for limiting the depth of the connector during placement of the connector 150, although auxiliary abutment means could be provided, such as by one or more abutment stops 106 as depicted in FIG. 3. The arched gripping bars 156 provide anchoring means for anchoring the connector 150 within the second structural layer as flowable structural material flows under and around gripping bars 156 and then hardens.

Figure 6:
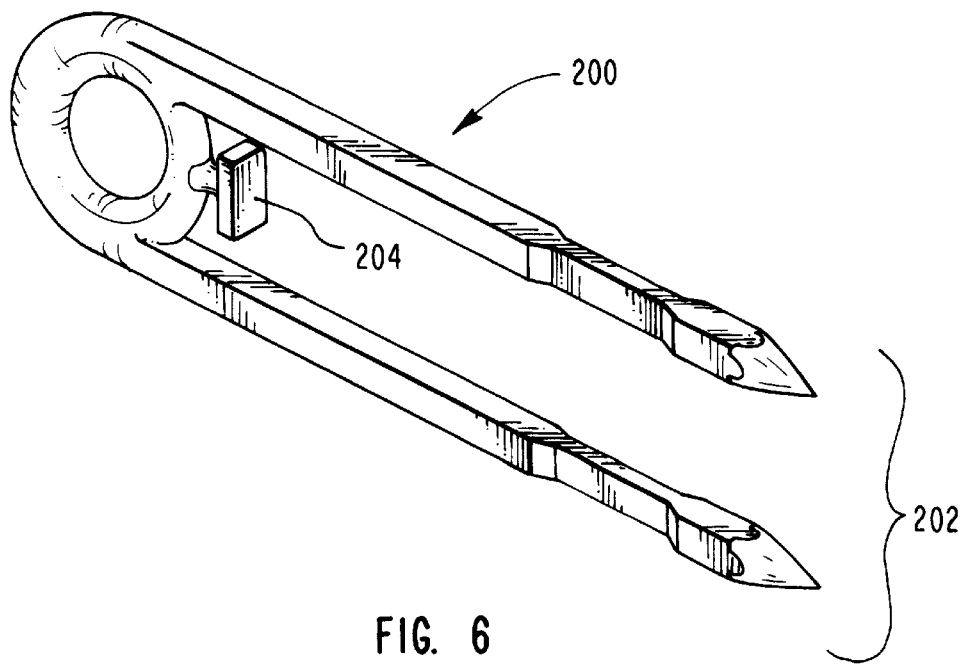
FIG. 6 is a perspective view of still another embodiment of a connector including auxiliary stopping means.

FIG. 6 depicts a connector 200 that is similar to the connector 10 depicted in FIG. 1, except that the prongs 202 of the connector 200 are shown having a generally square cross-section. In addition, the connector 200 includes an auxiliary abutment plate 204 disposed below the bridging loop to provide alternative means for limiting the depth of penetration of the connector 200. Because the abutment plate 204 is flat it can provide a more definite abutment means compared to the generally circular bridging loop 24 depicted in FIG. 1. Moreover, flowable structural material can flow in the space between the bridging loop and the abutment plate 204 to provide additional anchoring force upon hardening of the second structural layer.

Figure 5:
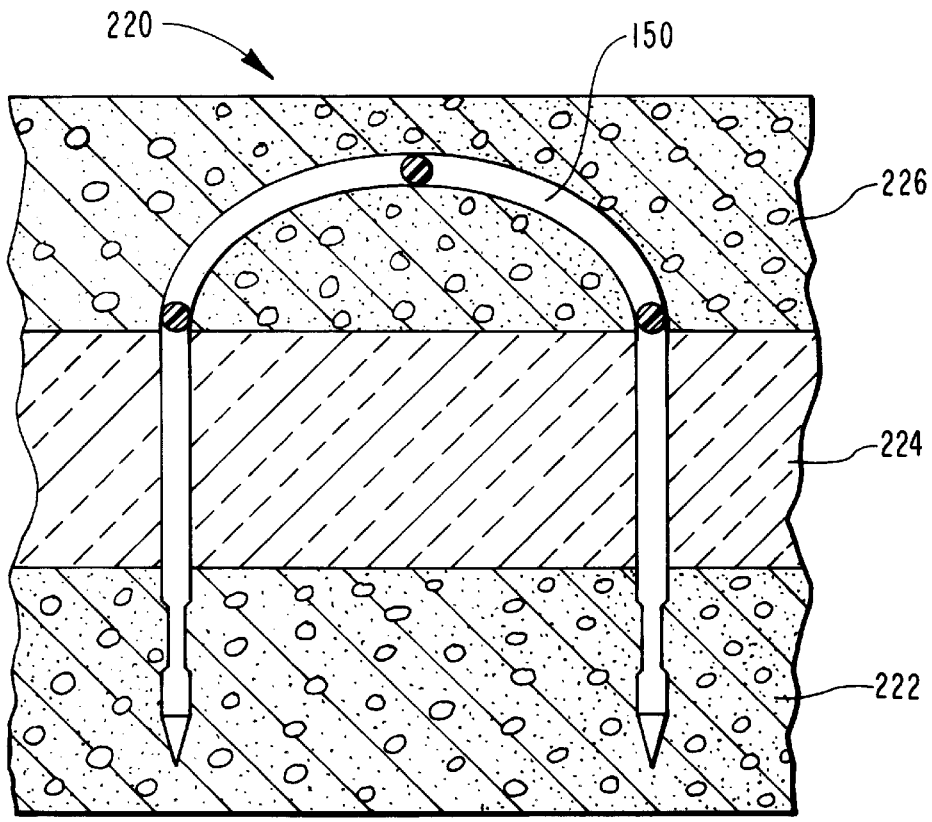
FIG. 5 is a cross-section view of a composite wall structure employing the multi-prong connector of FIG. 4.

Reference is now made to FIG. 5, which is a cross-sectional view depicting the connector 150 of FIG. 4 placed within a composite wall structure 220 comprising a first structural layer 222, an insulating layer 224, and a second structural layer 226. It can be seen how the structural material within the recesses of the penetrating segments of the two prongs anchors the connector 150 within the first structural layer 222. Similarly, the arched gripping structure serves to anchor the gripping segment of the connector 150 within the second structural layer 226.

In a preferred method for manufacturing composite wall structures according to the present invention, a first layer of structural material is poured into an appropriate form. In general, the first structural layer 222 will be a generally flat rectangular slab, although it may also include other design, ornamental, or structural features. The only limitation is that it have a thickness or depth great enough to give the structural layer adequate strength and also the ability to firmly and reliably anchor the penetrating segments of the connector prongs therewithin, particularly those having recesses that serve as anchoring means.

The first structural layer 222 may comprise any suitable material which can flow when initially cast and then harden to form a generally rigid structural layer. In a preferred embodiment, the first structural layer 222 will comprise a concrete material that includes a hydraulic cement binder, water, an aggregate material, and other appropriate admixtures. Concrete is preferred because of its low cost, high strength, and ease of casting compared to other materials. Nevertheless, any appropriate structural material may be used, such as high strength polymers, resins or other materials, which can flow when cast and later be hardened.

The insulating layer 224 may comprise any appropriate insulating material, such as polystyrene foam, fiberglass, aerogel, xerogel, xonotlite, seagel, polyisocyanate foam, polyurethane foam, urea-formaldehyde foam, and low density, highly insulating cementitious materials. Such insulating materials are given only by way of example and not by limitation.

The insulating layer 224 will preferably include a plurality of appropriately spaced holes that are predrilled or punched therethrough through which the prongs of the connectors of the present invention can be inserted, as described above. Because of the piercing effect of the penetrating tips of the prongs, it is often preferable to drill holes having a reduced diameter compared to the diameter of the prongs, particularly the mesial segment, to ensure a tight fit between the prongs and the insulating layer. This helps to prevent incursion of concrete into the insulating layer, which could create a thermal bridge through the insulating layer that might undermine the utility of the present invention. In many cases, no holes will be required at all because of the self-tapping nature of the substantially pointed penetrating tips of the connectors and depending on the type of insulation used.

After casting the first structural layer 222, and while it is still in a plastic and deformable state such that it is neither hardened nor rigid to the point that the connectors cannot be placed therein without damaging the structural integrity and strength of the structural layer 222, the insulating layer 224 is placed over the exposed surface of the first structural layer 222. Thereafter, a plurality of connectors are inserted through the aforementioned predrilled holes within the insulating layer 224 in a manner such that the penetrating segments of the prongs penetrate through the insulating layer 224 and into the first structural layer 222 and so that the mesial segment of the prongs reside within the insulating layer 224. Whatever abutment means is included within the connectors can act to limit penetration of the connectors through the insulation layer and first structural layer at a desired depth.

Once properly oriented, the penetrating segments of the prongs will substantially reside within the first structural layer 222, the mesial segments will substantially occupy a hole or space within the insulating layer 224, and the gripping segment will remain unembedded but will be protrude beyond the exposed surface of the insulating layer 224 until formation of the second structural layer 226. Because of the piercing effect of the penetrating tips of the connector prongs, it may be possible to drill holes having a substantially smaller diameter compared to the diameter of the prongs, or no holes may be required at all.

After the first structural layer 222 has achieved an adequate level of hardness or compressive strength, a second layer of structural material is poured over the surface of the insulating layer 224 to form the second structural layer 226, as shown in FIG. 5. The second structural layer 226 may also comprise any appropriate material that will initially flow and then harden to form a substantially rigid structural wall. Concrete is preferred due to its low cost, high strength and ease of formation. Nevertheless, the second structural layer 226 may comprise a different material than the first structural layer 222 in order to achieve a synergistic effect of using two different materials, such as by using a plastic material that will be intended to reside within the interior of a building formed using the composite wall structure.

Although the second structural layer 226 will also generally be a rectangular slab, it may also include other design, structural, or ornamental features, depending on the intended use of the composite wall structure. The thickness or depth of the second structural layer 226 should be such that it completely, or at least substantially, envelopes the entire gripping segment of the connectors in order to provide adequate anchoring of the gripping segments of the connectors within the second structural layer 226.

In some cases, it might be desirable to lay a second insulating layer over the yet unhardened second structural layer 226, followed by the insertion of additional connectors through the second insulating layer and the yet unhardened second structural layer 226 (not shown). Thereafter, a third structural layer (not shown) can be cast over the surface of the second insulating layer as before. Because of the simplicity of molding the connectors of the present invention, a connector specially adapted for multiple insulation layers could be molded that would connect all three structural layers together.

The various connectors described herein were used in experimental composite wall structures and were found to have more than adequate shear and bending strength to hold together the three layers of the composite wall structures that were tested. In addition, the connectors can be manufactured to have an appropriate flexibility for a given composite wall structure such that the connectors could resist failure while being caused to bend during uneven relative expansion or contraction of the two structural walls while still having adequate shear and tensile strength to reliably hold the structural walls together.

In general, whenever a material is heated or cooled, expansion or contraction of the material occurs. So in the case of an insulated concrete sandwich panel building, when the interior of the building is maintained at a given temperature and the exterior is exposed to ambient conditions, a temperature differential can occur between the interior and exterior wythes of concrete, which will result in the length and width of the exterior wythe increasing or decreasing relative to the interior wythe. This differential thermal growth can result in a forced deflection of any connectors between the interior and exterior wythes of concrete.

For a connector having a circular cross-sectioned prong that is forced to deflect a given distance, the resulting bending stresses experienced by each prong are directly proportional to the diameter of each individual prong, while the tensile and shear capacities of the overall connector are proportional to the cumulative cross-sectional area of all the prongs taken together. Thus, while the strength properties imparted by each of the prongs are cumulative vis-a-vis the entire connector, the stiffness is not. For elastic designs, the bending stresses experienced by the prongs are related or expressed by the following mathematical relationships:

(I) $\sigma_B = M_C/I$ where M=bending moment; C=distance from the neutral axis to the extreme outer edge of the prong; I=moment of inertia with respect to the neutral axis.

(II) $M = Wt/2$ where W is the load and t is the length of the prong through the insulation or insulation thickness for the case of one end fixed and the other end loaded and guided.

(III) $W = 12EI\delta/t^3$ where E=modulus of elasticity; $\delta$=the forced deflection of the connector prong.

(IV) $\delta = \alpha \Delta TL$ where $\delta$=the coefficient of thermal expansion of concrete; $\Delta T$=the temperature difference between the exterior and interior wythes of concrete; L=the width or height of the panel.

(V) For a tie with a circular cross-section $I = \pi D^4/64$ where D=connector prong diameter.

Compiling these formulas, the mathematical expression for bending stress becomes $\sigma_B = 3E\, \alpha \Delta TLD/t^2$. When comparing this expression for a single prong connector with a multi-prong connector all of the terms are the same except D.

The tensile and shear capacities of the overall connector are equal to the respective tensile or shear strengths of the material within each of the prongs multiplied by the cross-sectional area of the prongs. Therefore, if a connector having a single prong is replaced by a connector having two prongs (with equal diameter) whose total cross-sectional area is equal to the cross-sectional area of the single prong connector, then the diameter of each prong in the two-prong connector will be the diameter of the single prong connector divided by the square root of 2. Since the bending stress is proportional to the diameter of the prong, the bending stress on each of the prongs of the two-prong connector will be 1 divided by the square root of 2, or 70.7% of the bending stress of the single prong connector, which is a 29.2% reduction. For a three prong connector, the bending stress would be 1 divided by the square root of 3, or 57.7% of the bending stress of the single prong connector, which is a 42.3% reduction in bending stress. For a four prong connector, the bending stress would be 1 divided by the square root of 4, or 50% of the bending stress of the single prong connector, and so on. However, in each case the tensile and shear capacities of the overall connector would remain the same since the total cross-sectional area of the prongs remains the same on a cumulative basis. Of course, it is not necessary when increasing the number of prongs to always reduce the diameter of the prongs so that the total cross-sectional area of the multiple prongs equals the cross-sectional area of a hypothetical single prong connector. Those relationships were given by way of example, not by limitation.

In summary, the present invention provides improved connectors that are sufficiently flexible to resist failure and damage caused by uneven relative expansion of the structural layers but which have sufficient tensile and shear strength to maintain the structural integrity of the composite wall structure.

The present invention further provides connectors which have appropriate strength and flexibility characteristics, but which do not substantially increase the time and cost of placing the connectors caused by the need to increase the number of connectors.

In addition, the present invention provides connectors that actually reduce the time and effort needed to place the connectors compared to conventional connectors.

The invention also provides connectors that can be molded in a single step, or using a minimal number of steps, such that manufacturing costs can be reduced per unit connector.

In addition, the present invention provides connectors that include means for penetrating an insulation layer and an unhardened structural layer during placement.

The present invention further provides connectors that include means for easily grasping an placing the connectors to aid the installer.

The present invention additionally provides connectors that include means for ensuring proper spacing between clusters of connector units.

Finally, the present invention provides connectors that also include stopping means for controlling the depth of penetration through the insulating layer and unhardened structural layer during placement of the connectors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to embraced within their scope.

What is claimed and desired to be secured by United States Letters Patent is:

1. A multi-prong connector used in making a composite wall structure which includes first and second structural layers comprising a hardenable material and an insulating layer disposed between the first and second structural layers, wherein the connector comprises an insulating material and includes:

(a) a gripping segment having a bridging structure;

(b) a plurality of elongate prongs attached together by and extending from the bridging structure, each prong having a penetrating segment distal to the bridging structure and a mesial segment disposed between the penetrating segment and the gripping segment;

(c) a penetrating tip disposed on an end of at least one of the prongs and having a reduced cross-section width relative to the rest of the prong;

(d) first anchoring means disposed within the penetrating segment of at least one of the prongs for anchoring the connector within the first structural layer when substantially hardened; and (e) second anchoring means within the gripping segment for anchoring the connector within the second structural layer when substantially hardened.

2. A multi-prong connector as defined in claim 1, wherein the gripping segment includes a loop.

3. A multi-prong connector as defined in claim 2, wherein the loop bridges at least two of the prongs together and wherein the gripping segment further includes at least one auxiliary bridging structure which connects a third prong to the gripping segment.

4. A multi-prong connector as defined in claim 1, wherein the gripping segment includes a head disposed at an end of at least one of the prongs distal to the penetrating segment.

5. A multi-prong connector as defined in claim 1, wherein the bridging structure is configured so that the prongs are oriented substantially within a plane.

6. A multi-prong connector as defined in claim 1, wherein the bridging structure is configured so that the prongs are oriented in a three-dimensional orientation.

7. A multi-prong connector as defined in claim 1, further including abutment means for limiting penetration of the connector through the insulating layer during placement of the connector.

8. A multi-prong connector as defined in claim 7, wherein the abutment means extends from a portion of the gripping segment separate from the prongs.

9. A multi-prong connector as defined in claim 7, wherein the abutment means is disposed on at least one of the prongs.

10. A multi-prong connector as defined in claim 1, wherein the first anchoring means includes a recessed portion disposed in the penetrating segment of at least one of the prongs.

11. A multi-prong connector as defined in claim 1, wherein the second anchoring means includes at least a portion of the bridging structure.

12. A connector as defined in claim 1, wherein the gripping segment includes at least one arched gripping bar adjoined to the bridging structure.

13. A multi-prong connector as defined in claim 1, wherein the connector is formed from a resin selected from the group consisting of polyamides, polyarylsulfones, polycarbonates, polyphthalamides, polysulfones, polyphenylsulfones, polyethersulfones, aliphatic polyketones, acrylics, acrylonitrile-butadiene-styrene copolymers, polyfluorocarbons, polybutadienes, polybutylene teraphthalates, polyesters, polyethylene teraphthalates, polyphenylene ethers, polyphenylene oxides, polyphenylene sulfides, polyphthalate carbonates, polypropylenes, polystyrenes, polyurethanes, polyvinyl chlorides, polyxylenes, vinyl esters, diallyl phthalates, epoxy resins, furan resins, and phenolic resins, copolymers of the foregoing, and combinations of the foregoing.

14. A multi-prong connector as defined in claim 1, wherein the connector is impregnated with fibers selected from the group consisting of glass fibers, graphite fibers, boron fibers, cellulosic fibers, nylon fibers, ceramic fibers, polymeric fibers, and mixtures thereof.

15. A multi-prong connector as defined in claim 1, wherein the connector is molded in a single step.

16. A multi-prong connector used in making a composite wall structure which includes first and second structural layers comprising a hardenable material and an insulating layer disposed between the first and second structural layers, wherein the connector comprises an insulating material and includes:

(a) a gripping segment having a bridging structure;

(b) a plurality of elongate prongs attached together by and extending from the bridging structure in a substantially parallel orientation, each prong having a penetrating segment distal to the bridging structure and a mesial segment disposed between the penetrating segment and the gripping segment;

(c) a substantially pointed tip disposed on an end of each of the prongs;

(d) at least one recess disposed within the penetrating segment of each of the prongs for anchoring the connector within the first structural layer when substantially hardened;

(e) second anchoring means within the gripping segment for anchoring the connector within the second structural layer when substantially hardened; and (f) abutment means for limiting penetration of the connector through the insulating layer during placement of the connector.

17. An insulating composite wall structure comprising first and second structural layers made from a hardenable material and an insulating layer disposed between the first and second structural layers, the first and second structural layers and the insulating layer being secured together by means of a plurality of multi-prong connectors comprising an insulating material and including:

(a) a gripping segment having a bridging structure;

(b) a plurality of elongate prongs attached together by and extending from the bridging structure, each prong having a penetrating segment distal to the bridging structure and a mesial segment disposed between the penetrating segment and the gripping segment;

(c) a penetrating tip disposed on an end of at least one of the prongs and having a reduced cross-section width relative to the rest of the prong;

(d) first anchoring means disposed within the penetrating segment of at least one of the prongs for anchoring the connector within the first structural layer when substantially hardened; and (e) second anchoring means within the gripping segment for anchoring the connector within the second structural layer when substantially hardened.

18. An insulating composite wall structure as defined in claim 17, wherein at least one of said first and second structural layers comprises a concrete material.

19. An insulating composite wall structure as defined in claim 17, wherein the insulating layer is selected from the group consisting of polystyrene foam, fiberglass, aerogel, xerogel, xonotlite, seagel, polyisocyanate foam, polyurethane foam, urea-formaldehyde foam, insulating cementitious materials, and mixtures of the foregoing.

20. An insulating composite wall structure as defined in claim 17, wherein the composite wall structure is manufactured by the process comprising the steps of:

(a) forming a first layer of hardenable material while in a plastic and flowable state;

(b) placing the insulating layer over the first layer of hardenable material while in the plastic and flowable state;

(c) inserting a plurality of the connectors through the insulating layer and first layer of unhardened structural material such that the penetrating segment is substantially disposed within the first structural layer, such that the mesial segment is substantially disposed within the insulating layer, and such that the gripping segment is substantially exposed through a surface of the insulating layer; and (d) casting a second layer of hardenable material onto the surface of the insulating layer in order to form the second structural layer, the second structural layer having a thickness such that the gripping segment of each of the connectors is substantially enveloped within the second structural layer.

* * * * *

UNITED STATES PATENT AND TRADEMARK OFFICE
CERTIFICATE OF CORRECTION

PATENT NO. : 5,809,723

DATED : Sep. 22, 1998

INVENTOR(S) : David O. Keith; David M. Hansen

It is certified that error appears in the above-identified patent and that said Letters Patent is hereby corrected as shown below:

Col. 6, line 42, before "two" change "have" to --having--

Col. 9, line 36, after "FIG." change "26" to --1--

Col. 11, line 23, after "around" insert --arched--

Col. 12, line 31, after "of the" insert --first--

Col. 12, line 47, after "will" delete --be--

Col. 14, line 59, after "grasping" change "an" to --and--

Signed and Sealed this

Twenty-fourth Day of August, 1999

Attest:

Q. TODD DICKINSON

*Attesting Officer*  *Acting Commissioner of Patents and Trademarks*